US005944492A

United States Patent [19]

Konishi et al.

[11] Patent Number: 5,944,492

[45] Date of Patent: Aug. 31, 1999

[54] HYDRAULIC PUMP CONTROL SYSTEM

[75] Inventors: Hideo Konishi; Makoto Samejima, both of Tokyo, Japan

[73] Assignee: Shin Caterpillar Mitsubishi Ltd., Tokyo, Japan

[21] Appl. No.: 08/995,514

[22] Filed: Dec. 22, 1997

[30] Foreign Application Priority Data

Dec. 27, 1996 [JP] Japan .................................... 8-357840

[51] Int. Cl.[6] ................................ F04B 1/26; F16D 31/02

[52] U.S. Cl. ............................ 417/222.1; 60/430; 60/449

[58] Field of Search ................................ 417/44.1, 222.1; 60/449, 430

[56] References Cited

U.S. PATENT DOCUMENTS 4,809,504 3/1989 Izumi et al. .............................. 60/430

5,266,756 11/1993 Hatano .................................... 187/111

5,527,156 6/1996 Song .......................................... 417/2

*Primary Examiner*—Charles G. Freay

*Assistant Examiner*—Paul L. Ratcliffe

*Attorney, Agent, or Firm*—Oliff & Berridge, PLC

[57] ABSTRACT

A hydraulic pump control system is shown that can control the absorbing torque of a hydraulic pump with respect to the engine power for driving the hydraulic pump in a well-balanced manner, and reduce a deviation of an actual revolution number from a target revolution number of the engine. A torque of hydraulic pumps during operation is estimated from a pump pressure and first and second line pressures. Based on the estimated torque, an output torque of the hydraulic pumps is controlled so that an error between a target revolution number and an actual revolution number of the engine becomes null.

10 Claims, 10 Drawing Sheets

| OUTPUT: $\Delta Tr$ | | ESTIMATED TORQUE $T_P$ | | | | | | | |
|---|---|---|---|---|---|---|---|---|---|
| | | NB | NM | NS | ZO | PS | PM | PB | ij= |
| ESTIMATED TORQUE CHANGE $DT_P$ $\left(=\frac{\Delta T_P}{\Delta t}\right)$ | NB | W11 | W12 | W13 | W14 | W15 | W16 | W17 | 1j |
| | NM | W21 | W22 | W23 | W24 | W25 | W26 | W27 | 2j |
| | NS | W31 | W32 | W33 | W34 | W35 | W36 | W37 | 3j |
| | ZO | W41 | W42 | W43 | W44 | W45 | W46 | W47 | 4j |
| | PS | W51 | W52 | W53 | W54 | W55 | W56 | W57 | 5j |
| | PM | W61 | W62 | W63 | W64 | W65 | W66 | W67 | 6j |
| | PB | W71 | W72 | W73 | W74 | W75 | W76 | W77 | 7j |
| | ij= | i1 | i2 | i3 | i4 | i5 | i6 | i7 | |

FIG. 7

HYDRAULIC PUMP CONTROL SYSTEM

BACKGROUND OF THE INVENTION

1. Field of Invention

The present invention relates to the technical field of hydraulic pumps equipped on working machinery such as hydraulic shovels.

2. Description of Related Art

Generally, some working machinery such as hydraulic shovels, for example, are equipped with a variable displacement hydraulic pump driven by the engine power, and are designed to supply pressurized oil delivered from the hydraulic pump to a plurality of hydraulic actuators through directional control valves whose opening degrees varies depending on stroke shifts of operating units. To supply the pressurized oil to the plurality of hydraulic actuators, which are operated in a combined manner, at flow rates neither under nor over proper values, the torque input or power input to the variable displacement pump—hereinafter referred to as a pump absorbing torque (or absorbing horsepower) is required to be controlled with respect to an engine torque (or engine horsepower) while keeping a good balance so that an actual revolutions per unit time—hereinafter referred to as revolution number of the engine follows a target revolution number thereof.

In view of such an requirement, a shown in FIG. 10, it has been hitherto proposed to control a torque control pressure Ps supplied to pump regulators 12, 13 by using a controller 30.

Specifically, in FIG. 10, the controller 30 receives detection signals from a revolution number sensor 22 for detecting a revolution number of the engine 11 and a pressure switch 31 for determining whether hydraulic pumps 9, 10 are delivering pressurized oil. Then, the controller 30 outputs a control signal to a solenoid proportional reducing valve 14 for controlling a total absorbing torque (or horsepower) of the hydraulic pumps so that the engine revolution number follows a target revolution number. The control signal is subject to electro-hydraulic conversion by the solenoid proportional reducing valve 14, and a resulting torque control pressure Ps is supplied to regulators 12, 13.

In the conventional torque (horsepower) control, however, detection signals necessary for calculating oil amounts (flow rates) delivered from the hydraulic pumps (e.g., detection signals indicating stroke shifts of operating units) are not input to the controller, and there is a difficulty in accurately estimating the absorbing torque required by the hydraulic pumps. This has raised a problem that a balance between the engine output and the pump absorbing torque is lost just before start and after end of manipulation of the operating units or when the operating units are manipulated slightly, and a deviation of the actual revolution number from the target revolution number of the engine is so increased as to deteriorate operability. That problem is to be overcome by the present invention.

Also, an adjustment process of conventional controllers requires tuning for each of different models of working machinery even if they belong to a similar type of working machinery. In other words, the adjustment process has been troublesome because of the necessity of executing specific parts of the control program separately for each model.

Further, there is a difference between specific units of working machinery that are even the same model. In addition, working environment depends on the ambient conditions at sites (e.g., a cold district or a warm district), and engine fuel may be changed depending on users. Changes in various conditions such as the differences between specific units of working machinery and working environment have raised another problem to be overcome that the tuning made before shipping of working machinery is not adaptable practically and a deviation of the actual revolution number from the target revolution number of the engine is increased to an unallowable level.

SUMMARY OF THE INVENTION

In consideration of the state of art set forth above, the present invention has been accomplished with a view of solving the foregoing problems. The present invention provides a hydraulic pump control system for use with a variable displacement hydraulic pump driven by an engine and supplying pressurized oil to a hydraulic actuator in accordance with an operating movement, hereinafter referred to as a stroke shift of an operating unit, wherein actual-revolution-number detecting means for detecting an actual revolution number of the engine and output status detecting means for detecting an output status of the hydraulic pump are connected to a controller for controlling an output torque of the hydraulic pump, and the controller estimates a torque of the hydraulic pump during operation from a detection result of the output status detecting means, and controls the output torque of the hydraulic pump based on the estimated torque so that an error between a preset target revolution number and the actual revolution number of the engine becomes null.

With the above construction, the output torque of the hydraulic pump is controlled based on the estimated torque estimated from the detection result of the output status detecting means so that the error between the target revolution number and the actual revolution number of the engine becomes null. Therefore, even just before start and after end of manipulation of the operating unit or even when the operating unit is manipulated slightly, the revolution number error is prevented from varying remarkably, and operability is improved.

In the above hydraulic pump control system, the controller may include an estimated torque arithmetic section for estimating a delivery oil amount of the hydraulic pump during operation from the detection result of the output status detecting means, and computing an estimated torque of the hydraulic pump and a change of the estimated torque based on the estimated delivery oil amount. With this feature, the estimated torque can be determined accurately.

In that case, the output status detecting means may comprise delivery pressure detecting means for detecting a delivery pressure of the hydraulic pump, and stroke shift detecting means for detecting the stroke shift of the operating unit or line pressure detecting means for detecting a line pressure variable depending on the stroke shift of the operating unit. This feature makes it possible to determine both the delivery pressure and the delivery oil amount of the hydraulic pump.

Further, the controller may include a fit factor arithmetic section for determining, based on the estimated torque and the estimated torque change both computed by the estimated torque arithmetic section, a fit factor of the estimated torque for a first preset numeral range and a fit factor of the estimated torque change for a second preset numeral range, and then computing a combined value of those fit factors, and control the output torque of the hydraulic pump based on the fit-factor combined value computed by the fit factor arithmetic section and the engine revolution number error.

With that feature, the output torque of the hydraulic pump can be controlled in accordance with the output status of the hydraulic pump during operation and the engine revolution number error. The output status of the hydraulic pump varies depending on the models, the individual differences, etc. of working machinery, or the dynamic characteristic of the engine revolution number varies depending on changes in working environment and changes in engine characteristic caused by using different types of engine fuel. However, the control system having the above-described features can control the hydraulic pump in a manner adapted to a particular unit of working machinery, while repeating the learning process.

Alternatively, the controller may include a fit factor arithmetic section for, based on the estimated torque and the estimated torque change both computed by the estimated torque arithmetic section, computing an error of the estimated torque with respect to a target torque and determining a fit factor of the estimated torque error for a first preset numeral range, a fit factor of the estimated torque change for a second preset numeral range, and a fit factor of a pump allowable torque for a third preset numeral range, and for then computing a combined value of those fit factors, and may control the output torque of the hydraulic pump based on the fit-factor combined value computed by the fit factor arithmetic section and the engine revolution number error.

This feature provides an advantage that the need of individually setting the consequent variable for each set value of the engine target revolution number is eliminated and the memory capacity required for the controller can be cut down. Another advantage is that since the fit factor is also computed for the error of the estimated torque with respect to the target torque, the hydraulic pump can be controlled in a manner adapted for changes of the estimated torque error, in addition to the engine revolution number error, which is also caused depending on the operating conditions, the individual differences of working machinery, working environment, etc.

Moreover, the controller may include a fuzzy-rule-antecedent arithmetic section for applying the estimated torque and the estimated torque change both computed by the estimated torque arithmetic section to each set of antecedent rules for fuzzy control, computing fit factors of the antecedent rules by using membership functions of the antecedent rules, and computing a combined value of the fit factors of each set of the antecedent rules. The controller may also include a fuzzy-rule-consequent arithmetic section for computing a consequent variable based on each fit-factor combined value computed by the fuzzy-rule-antecedent arithmetic section and the engine revolution number error, and the controller may calculate an average value of the consequent variables from the fit-factor combined values and the consequent variables each computed by the antecedent and consequent arithmetic sections, respectively, and control the output torque of the hydraulic pump based on the computed average value.

Alternatively, the controller may include a fuzzy-rule-antecedent arithmetic section for applying the error of the estimated torque, estimated by the estimated torque arithmetic section, with respect to the target torque, the estimated torque change, and the pump allowable torque to each set of antecedent rules for fuzzy control, computing fit factors of the antecedent rules by using membership functions of the antecedent rules, and computing a combined value of the fit factors of each set of the antecedent rules. Such a controller may further include a fuzzy-rule-consequent arithmetic section for computing a consequent variable based on each fit-factor combined value computed by the fuzzy-rule-antecedent arithmetic section and the engine revolution number error, and the controller may calculate an average value of the consequent variables from the fit-factor combined values and the consequent variables each computed by the antecedent and consequent arithmetic sections, respectively, and control the output torque of the hydraulic pump based on the computed average value.

By employing such fuzzy control, the control process can have continuity at the boundary between adjacent two ranges, and produce a control output changing continuously and smoothly.

BRIEF DESCRIPTION OF THE DRAWINGS

FIG. 7 is a table showing fuzzy rules.

DETAILED DESCRIPTION OF PREFERRED EMBODIMENTS

Figure 1:
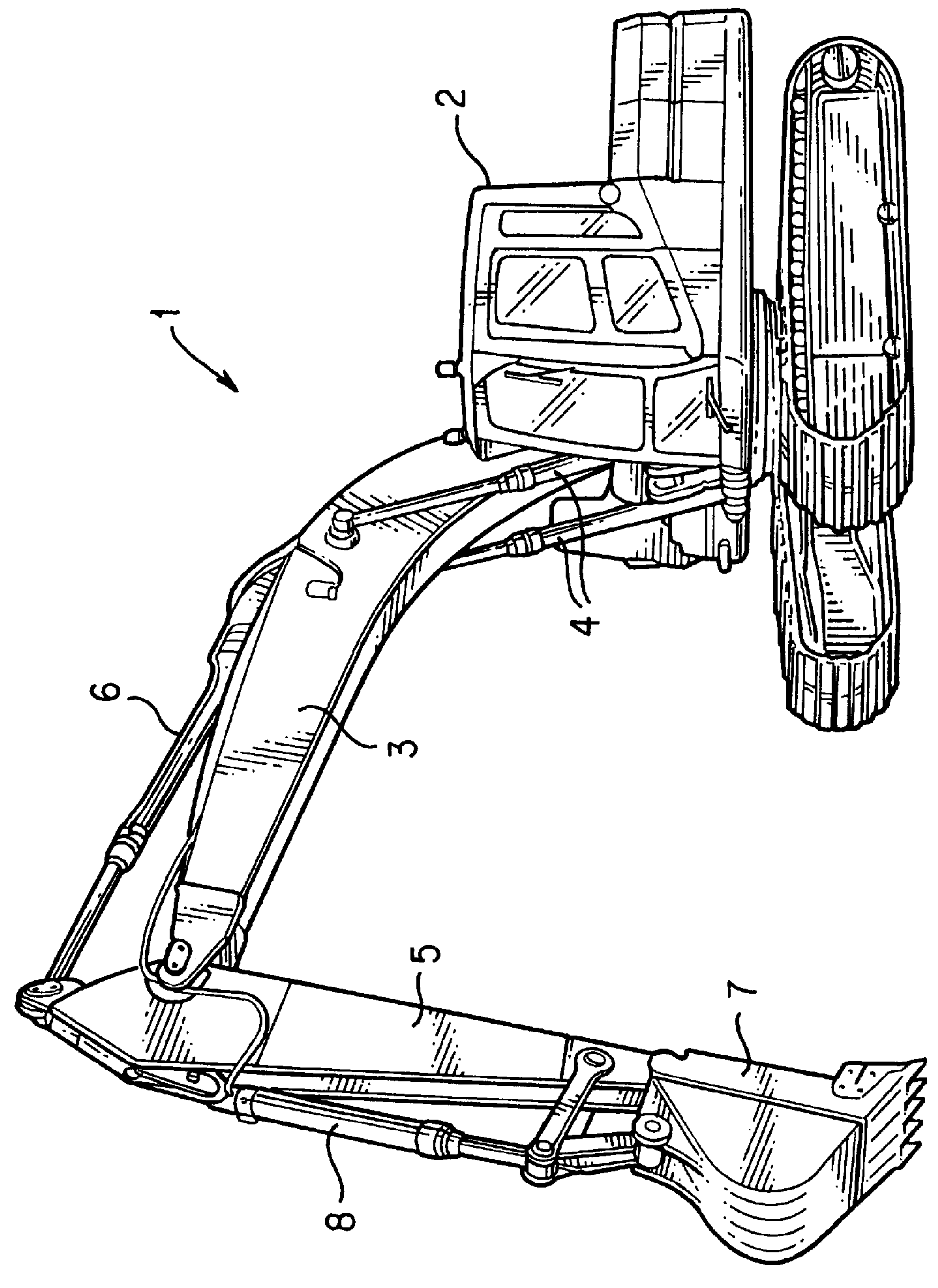
FIG. 1 is a perspective view of a hydraulic shovel.

A first embodiment of the present invention will be described below with reference to FIGS. 1 to 8. In FIG. 1, a hydraulic shovel 1 includes various hydraulic actuators such as a swing motor (not shown) for swinging an upper structure 2, a boom cylinder 4 for operating a boom 3, a stick cylinder 6 for operating a stick 5, and a bucket cylinder 8 for operating a bucket 7. These hydraulic actuators are the same in basic construction as conventional.

Figure 2:
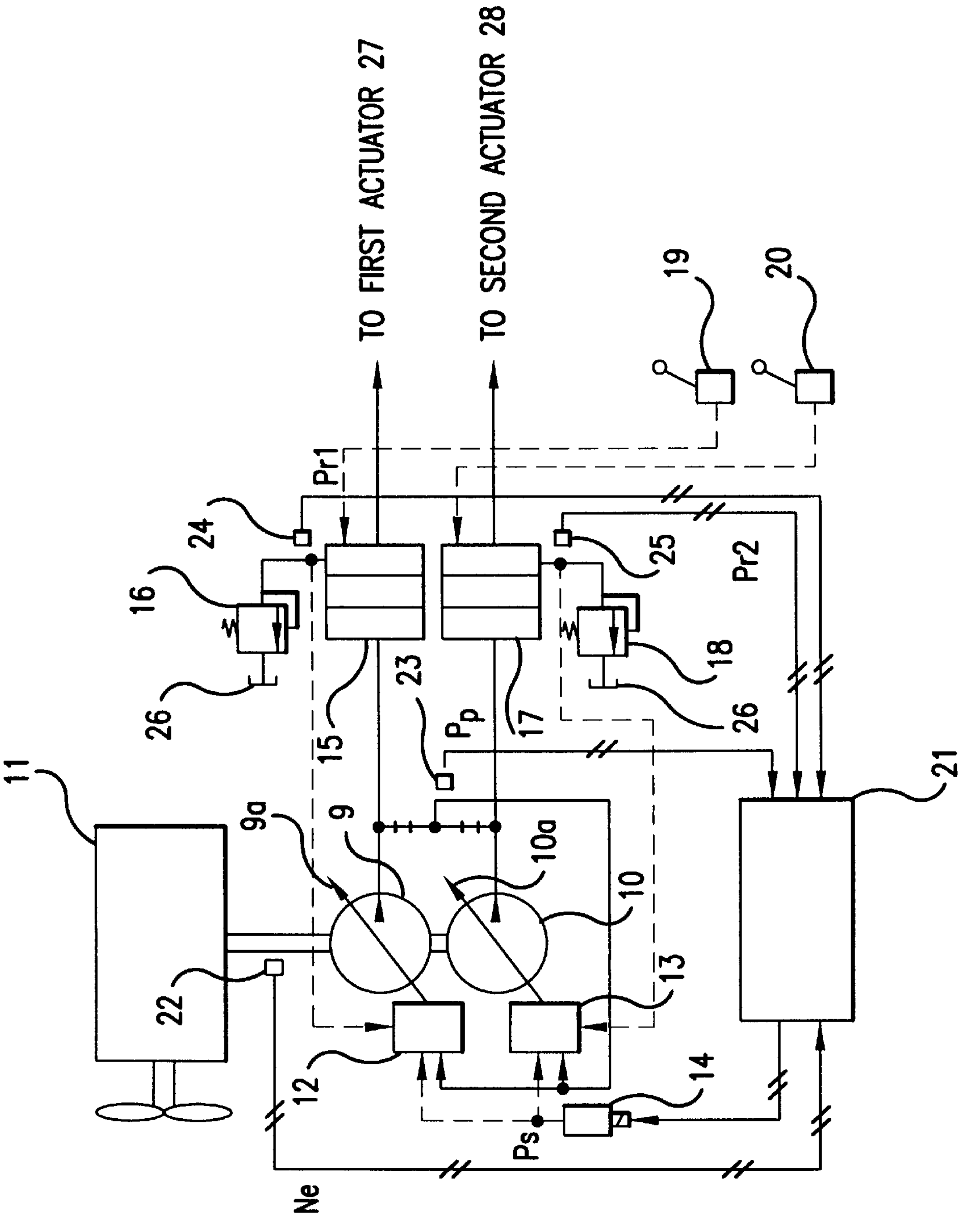
FIG. 2 is a schematic diagram showing the configuration of a power unit system.

FIG. 2 is a diagram schematically showing the configuration of a power unit system in this embodiment. In FIG. 2, denoted by reference numerals 9, 10 are first and second variable displacement hydraulic pumps driven by power of an engine 11 for supplying pressurized oil to the aforementioned hydraulic actuators. The first and second variable displacement hydraulic pumps 9, 10 are constructed of swash plate type axial piston pumps which vary delivery flow rates depending on changes in tilt angle of swash plates 9*a*, 10*a*. Denoted by 12, 13 are regulators for displacing the swash plates 9*a*, 10*a*. The regulators 12, 13 are controlled, as described later, in accordance with a torque control pressure Ps supplied from a solenoid proportional reducing valve 14, pressures Pr1, Pr2 in lines through which the pressurized oil having passed first and second directional control valves 15, 17 flows toward a reservoir 26, and a pressure Pp in a delivery line of the hydraulic pumps 9, 10. For simplicity of explanation, there are illustrated only two actuators in FIG. 2; i.e., first and second hydraulic actuators 27, 28 to which the pressurized oil is supplied respectively from the first and second hydraulic pumps 9, 10.

The first and second directional control valves 15, 17 control the flow rates of the pressurized oil and the direction in which the pressurized oil is supplied to the first and second hydraulic actuators 27, 28. The first and second directional control valves 15, 17 are operated upon receiving control pressures corresponding to the operating movements, hereinafter referred to as stroke shifts of control levers 19, 20. Additionally, first and second relief valves 16, 18 are disposed in respective lines through which the pressurized oil having passed center bypass passages of the first and second directional control valves 15, 17 flows toward the reservoir 26.

In the above hydraulic circuit, when the stroke shifts of the control levers 19, 20 are zero (i.e., when the levers are in neutral positions), the directional control valves 15, 17 are held in positions to close their valve passages communicating with the hydraulic actuators 27, 28. The pressurized oil delivered from the hydraulic pumps 9, 10 therefore flows into the tank 26 through the center bypass passages of the first and second directional control valves 15, 17 and the relief valves 16, 18. At this time, the pressures Pr1, Pr2 in the inlet lines of the relief valves 16, 18 are given as relief set values. When the control levers 19, 20 are manipulated from the above state, the directional control valves 15, 17 gradually open the valve passages communicating with the hydraulic actuators 27, 28, while gradually closing the center bypass passages. After that, when the control levers 19, 20 are manipulated to full strokes, the valve passages communicating with the hydraulic actuators 27, 28 are fully opened, while the center bypass passages are fully closed. No pressurized oil passes the relief valves 16, 18 and the pressures Pr1, Pr2 in the inlet lines of the relief valves 16, 18 lower down to a level near the tank pressure. Thus, the pressures Pr1, Pr2 in the inlet lines of the relief valves 16, 18 are changed depending on the lever stroke shifts, and the resulting pressures Pr1, Pr2 are transmitted to the regulators 12, 13 as stated above.

A controller 21 is constructed of a microcomputer and associated peripheral devices. The controller 21 receives detection signals from a revolution number sensor 22 for detecting a revolution number Ne of the engine 11, a pressure switch 23 for detecting a delivery pressure Pp of the hydraulic pumps 9, 10, and pressure sensors 24, 25 for detecting the pressures Pr1, Pr2 in the inlet lines of the relief valves 16, 18, etc., and outputs a control signal to the solenoid proportional reducing valve 14 based on those detection signals. The control signal is subject to electro-hydraulic conversion by the solenoid proportional reducing valve 14, and a resulting torque control pressure Ps is supplied to the regulators 12, 13.

Figure 6:
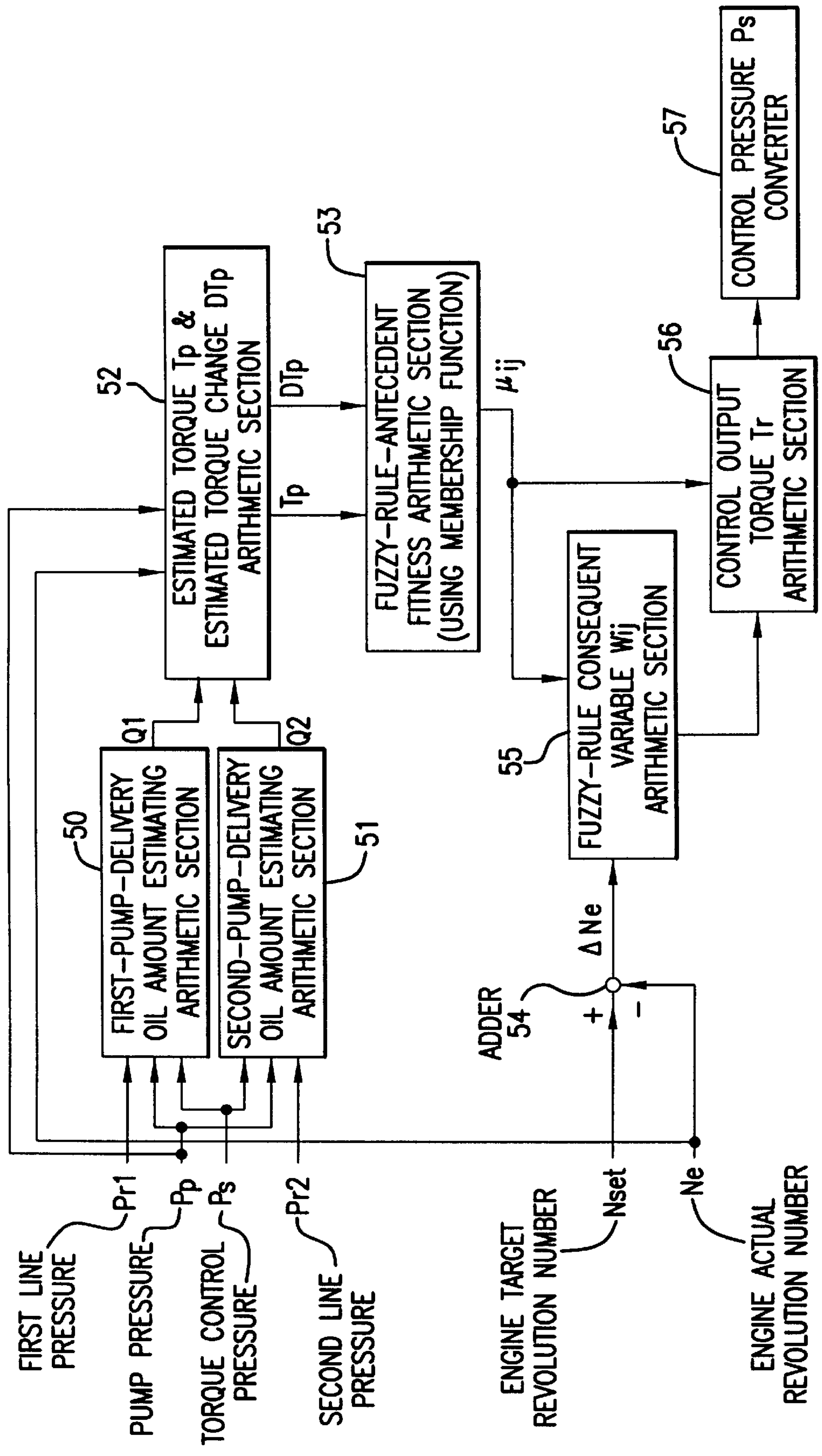
FIG. 6 is a block diagram showing the control sequence of a controller according to a first embodiment.

FIG. 6 is a block diagram of the control sequence executed in the controller 21. In FIG. 6, a first-pump-delivery oil amount estimating arithmetic section 50 receives the pressure Pr1 in the inlet line of the first relief valve 16 (hereinafter referred to as the first line pressure) detected by the pressure sensor 24, the delivery pressure Pp of the hydraulic pumps 9, 10 (hereinafter referred to as the pump pressure) detected by the pressure sensor 23, and the torque control pressure Ps in the previous step, and estimates a delivery oil amount (delivery flow rate) Q1 of the first hydraulic pump 9 based on values of those input signals.

A second-pump-delivery oil amount estimating arithmetic section 51 receives the pressure Pr2 in the inlet line of the second relief valve 18 (hereinafter referred to as the second line pressure) detected by the pressure sensor 25, the pump pressure Pp, and the torque control pressure Ps in the previous step, and estimates a delivery oil amount (delivery flow rate) Q2 of the second hydraulic pump 10 based on values of those input signals.

An estimated torque arithmetic section 52 receives the estimated oil amounts Q1, Q2, the pump pressure Pp, and an engine revolution number (hereinafter referred to as an actual revolution number) Ne detected by the revolution number sensor 22, and computes an estimated torque Tp produced by the two hydraulic pumps 9, 10 and a change DTp of the estimated torque Tp based on values of those input signals. The change DTp represents a torque change per unit time and is expressed in units of d(Tp)/dt.

Denoted by 53 is a section for computing a fit factor of the antecedent of a fuzzy rule (hereinafter referred to as an antecedent arithmetic section) which receives the estimated torque Tp and the estimated torque change DTp, and quantitatively computes, based on values of those input signals, a fit factor of the antecedent (corresponding to the if~ part in the rule expression of "if~then~") of a fuzzy rule by using a membership function.

An adder 54 receives a preset target revolution number Nset of the engine 11 and the actual revolution number Ne of the engine 11 detected by the revolution number sensor 22, and computes a difference error ΔNe between both of the revolution numbers.

Denoted by 55 is a section for computing a variable Wij of the fuzzy rule consequent (hereinafter referred to as a consequent arithmetic section) which receives the computed result of the antecedent arithmetic section 53 and the revolution number error ΔNe, and computes a value of the variable Wij of the fuzzy rule consequent based on values of those input signals.

A control output torque arithmetic section 56 receives the computed result of the antecedent arithmetic section 53 and the computed result of the consequent arithmetic section 55, and computes a set value (control output torque) Tr of the absorbing torque of the hydraulic pumps 9, 10. The output control torque Tr is then converted by a control pressure converter 57 into a torque control pressure Ps for the solenoid proportional reducing valve 14.

Characteristics of the engine 11 and the hydraulic pumps 9, 10 in this embodiment will now be described.

Figure 3:
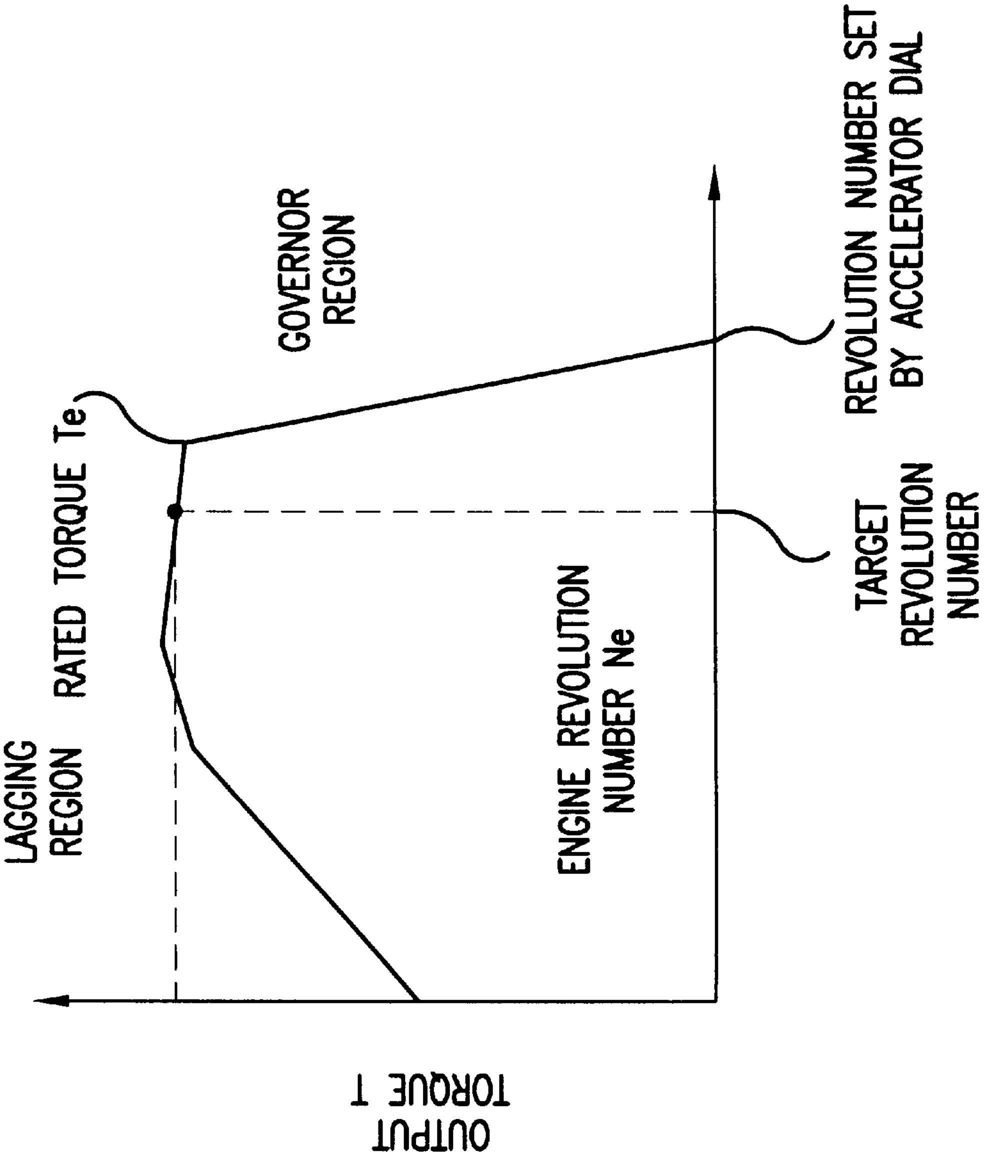
FIG. 3 is a graph showing the relationship between an engine output characteristic and a target revolution number.
Figure 4:
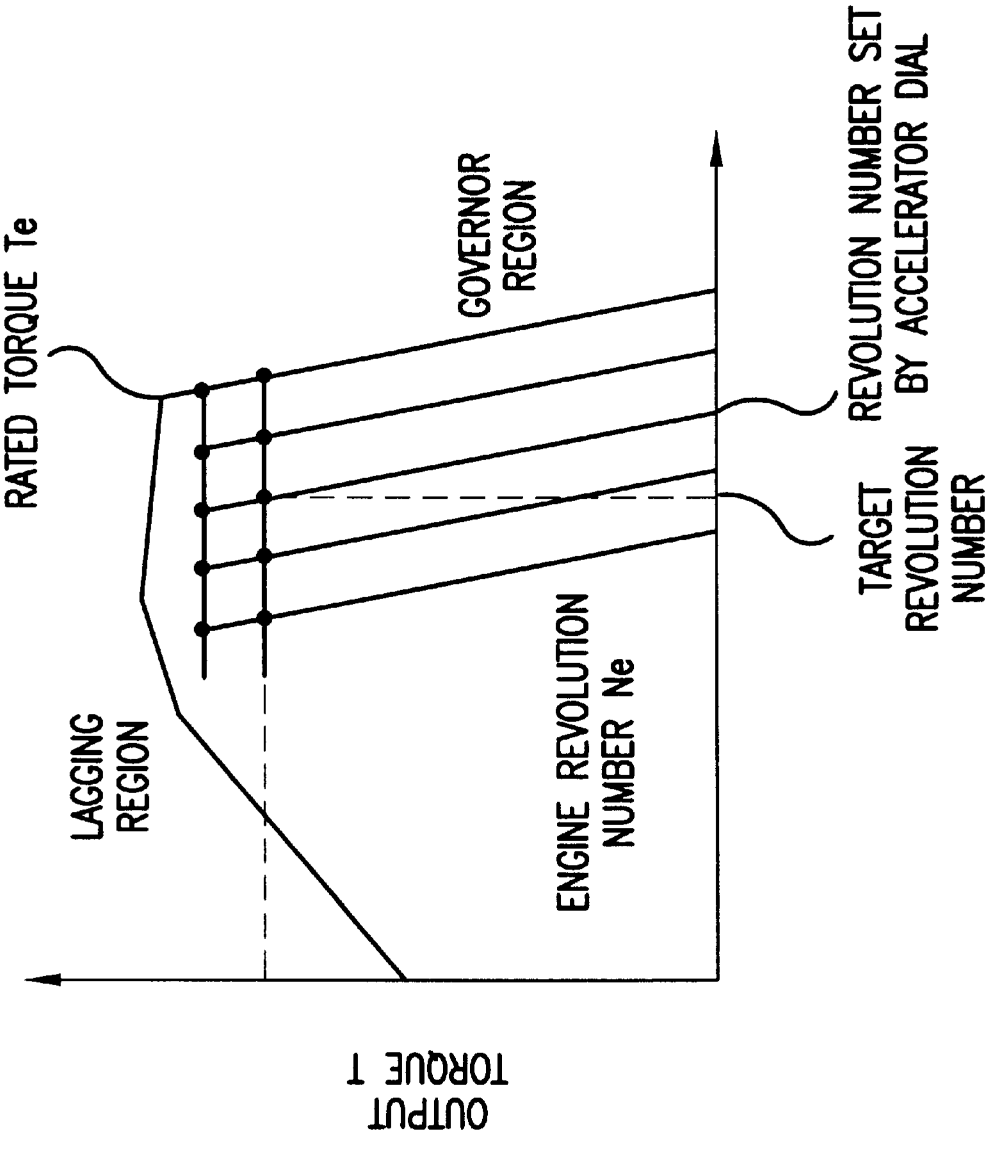
FIG. 4 is a graph showing the relationship between an engine output characteristic and a target revolution number.

First, each of FIGS. 3 and 4 shows the relationship between an engine output characteristic and a target revolution number. FIG. 3 shows the case of utilizing 100% of the engine power and FIG. 4 shows the case of changing a set value of an accelerator dial and utilizing the engine power of less than 100%.

In FIGS. 3 and 4, the engine output falls into a governor region and a lagging region with the point of a rated torque Te between the two regions. The governor region is an output region where the governor opening degree is less than 100%, and the lagging region is an output region where the governor opening degree is 100%.

When heavy excavation work is carried out by the hydraulic shovel 1 having the above engine output characteristic, the target revolution number Nset is set to a point indicated by the mark • in FIG. 3, i.e., a value a little lower than the rated torque revolution number (the engine revolution number at the rated point) in order to perform the work under condition where the engine output is 100% and fuel economy is good.

Also, when light excavation work is carried out, the engine output is not required to reach 100% and the accelerator dial may be set to a lower value during the work. Therefore, a horizontal coordinate value of each point indicated by the mark • in FIG. 4 provides the target revolution number, and a vertical coordinate value of the point indicated by the mark • in FIG. 4 provides the target torque of the engine.

The controller 21 outputs a signal of the torque control pressure Ps to the solenoid proportional reducing valve 14 to operate the regulators 12, 13 so that the absorbing torque of the hydraulic pumps 9, 10 is balanced with the engine output.

Figure 5:
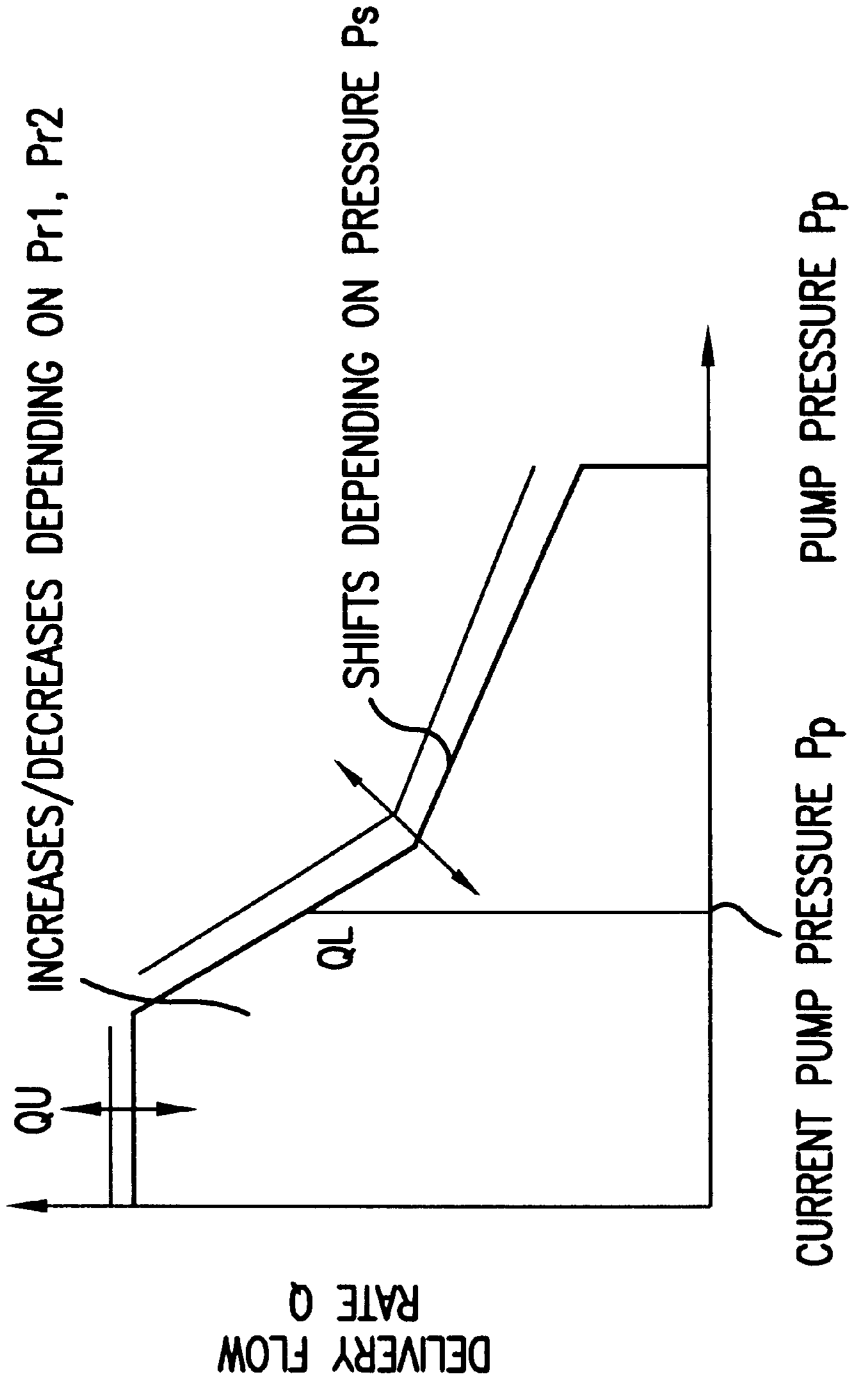
FIG. 5 is a graph showing a characteristic of a hydraulic pump regulator.

On the other hand, FIG. 5 shows a characteristic of each of the regulators 12, 13 of the hydraulic pumps 9, 10. In FIG. 5, a maximum delivery oil amount (maximum delivery flow rate) QU that results when the pump pressure Pp is low, increases and decreases depending on the first and second line pressures Pr1, Pr2, which are changed in accordance with the stroke shifts of the control levers 19, 20. When the lever stroke shifts are small, the regulators 12, 13 are operated to reduce the maximum delivery oil amount QU.

When the pump pressure Pp is medium or high, a delivery oil amount (delivery flow rate) QL lowers with an increase in the pump pressure Pp. This pressure range (corresponding to the range of oblique characteristic lines in FIG. 5) represents a region (called a torque constant curve or a horsepower constant curve) where the absorbing torque (or horsepower) of the hydraulic pumps 9, 10 is constant. In this region, when a command signal of the torque control pressure Ps applied to the solenoid proportional reducing valve 14 is changed, the torque constant curve shifts in the direction of the arrows in FIG. 5 to vary the pump absorbing torque (or horsepower).

In other words, the delivery oil amount QU of the hydraulic pumps 9, 10 can be estimated from the first and second line pressures Pr1, Pr2, and the delivery oil amount QL falling on the torque constant curve can be estimated from the current torque control pressure Ps and the current pump pressure Pp. It is therefore possible to accurately determine a delivery flow rate Q of the hydraulic pumps 9, 10 during the operation, and to accurately estimate an output torque based on the delivery flow rate Q.

The arithmetic sequence executed by the arithmetic sections 50–56 of the controller 21 will be described below.

To begin with, the first-pump-delivery oil amount estimating arithmetic section 50 estimates the delivery oil amount Q1 of the first pump 9 from the first line pressure Pr1, the pump pressure Pp, and the torque control pressure Ps in the previous step based on the regulator characteristic of FIG. 5. The second-pump-delivery oil amount estimating arithmetic section 51 estimates the delivery oil amount Q2 of the second pump 10 in a like manner except that it receives the second line pressure Pr2.

The estimated torque arithmetic section 52 computes the estimated torque Tp of the hydraulic pumps 9, 10 from the estimated delivery oil amounts Q1, Q2 by using the following formula;

$$Tp=(Q1+Q2)Pp/(2\pi \cdot Ne \cdot \eta) \quad (1)$$

where Q1, Q2 are the delivery oil amounts of the first and second pumps 9, 10 estimated by the delivery oil amount estimating arithmetic sections 50, 51, Pp is the pump pressure, Ne is the engine actual revolution number, and η is the pump efficiency.

After that, the arithmetic section 52 computes the time-dependent change DTp of the estimated torque Tp from the following formula;

$$DTp=(Tp(k)-Tp(k-1))/(t(k)-t(k-1)) \quad (2)$$

where (k) and (k−1) represent steps of the control process; (k) the current step and (k−1) the previous step, and t is time.

The antecedent arithmetic section 53 receives the estimated torque Tp and the estimated torque change DTp, and computes a fit factor of the antecedent (the if~ part) of a fuzzy rule.

FIG. 7 is a table showing fuzzy rules. In FIG. 7, the row including NB, NM, ~, PB given for the estimated torque Tp and the column including NB, NM, ~, PB given for the change DTp represent antecedent rules. Also, Wij (i=1~7, j=1~7) in the table is a consequent variable.

Here, NB, NM, NS, ZO, PS, PM and PB are abbreviations of Negative Big, Negative Medium, Negative Small, Zero, Positive Small, Positive Medium and Positive Big, respectively, and are called fuzzy labels. These fuzzy labels have meanings as follows: for the estimated torque Tp, NB means that the torque is fairly small, PB means that the torque is fairly big, and so on, whereas for the torque change DTp, NB means that the torque change is negative and big, PB means that the torque change is positive and big, and so on.

Further, the fit factor represents a degree of agreement with the actual condition for each of the fuzzy labels in a quantitative manner, and a membership function is used for the quantification in fuzzy control.

Figure 8:
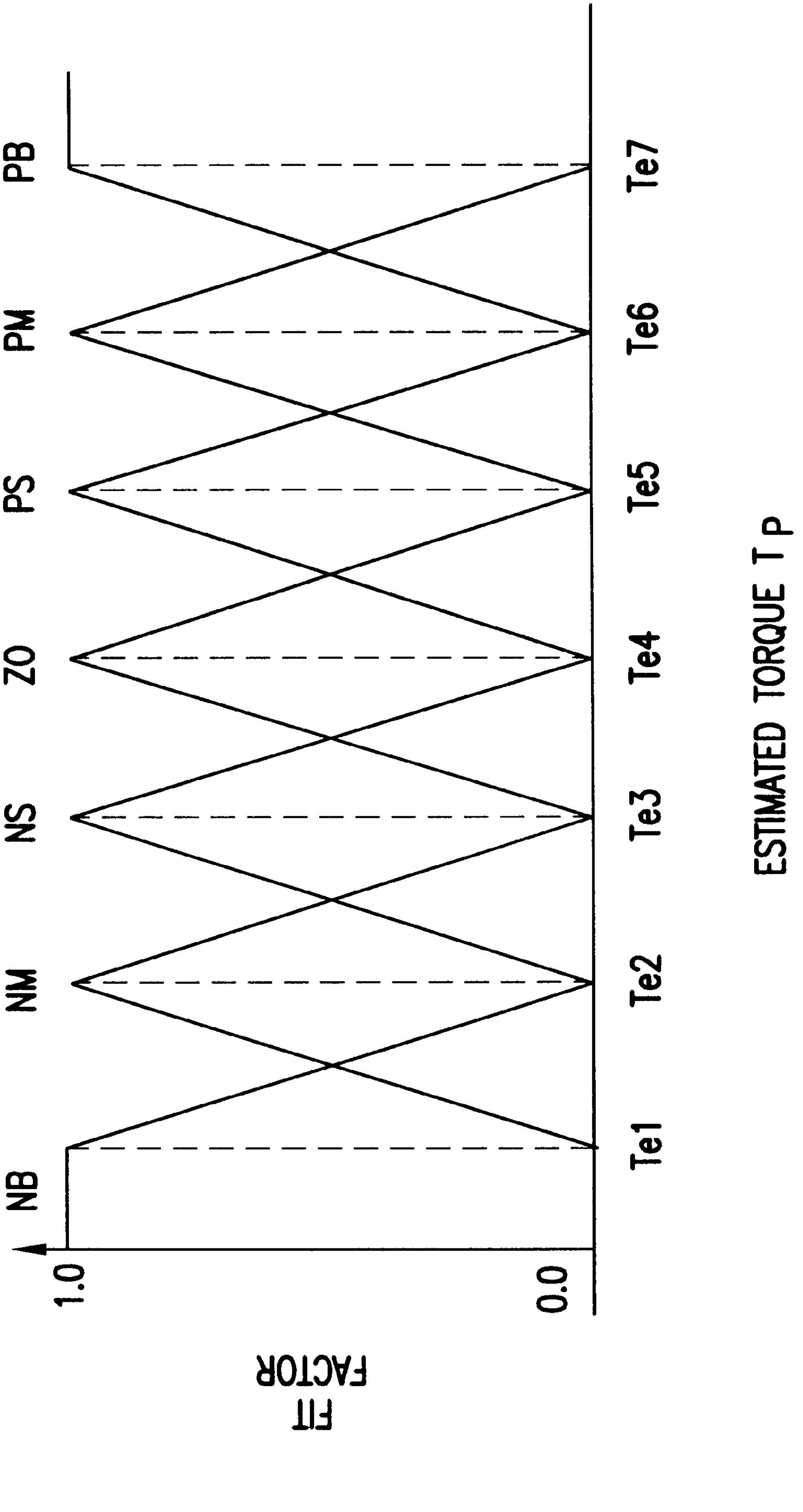
FIG. 8 is a chart showing examples of membership functions used for the antecedents of the fuzzy rules.

FIG. 8 is a chart showing examples of the membership functions used for the estimated torque Tp. Where the antecedent rule is given by "if Tp is NM", for example, a value of the membership function for the estimated torque Tp is determined by using the membership function (triangular) corresponding to "NM" in FIG. 8, and the determined value is defined as the fit factor of the above antecedent rule. This is equally applied to the other antecedent rules.

Subsequently, the antecedent arithmetic section 53 determines a combined value of fit factors of the antecedent rules as follows. Based on an assumption that the fit factor of each antecedent rule for the estimated torque Tp is μj, j=1~7(j=1, 2, . . . , 7 correspond respectively to NB, NM, . . . , PB, ) and the fit factor of each antecedent rule for the torque change DTp is μi, i=1~7(i=1, 2, . . . , 7 correspond respectively to NB, NM, . . . , PB), a combined value μij of μi and μj is determined by using the following formula:

$$\mu ij=\mu i \times \mu j \quad (3)$$

As an alternative, the combined value may be computed by using the following formula other than the above (3);

$$\mu ij \min(\mu i, \mu j) \quad (3\text{-}a)$$

where min is a function of selecting a minimum value.

The consequent arithmetic section 55 receives the error ΔNe of the actual revolution number Ne with respect to the target revolution number Nset of the engine, the error ΔNe being output from the adder 54, and the combined value μij output from the antecedent arithmetic section 53, and computes a value of the variable Wij of the fuzzy rule consequent based on the following formula;

$$Wij(k)=Wij(k-1)-\gamma \cdot \Delta t \cdot \Delta Ne \cdot \mu ij \quad (4)$$

where γ is the learning gain, Δt is the control cycle time, ΔNe is the revolution number error, and μij is the combined value of fit factors of the antecedent rules (i=1~7, j=1~7).

In the control process using the formula (4), the higher the fit factor of the antecedent rule (the closer the antecedent rule is to the actual condition) and the larger the revolution number error ΔNe, the larger is the second term of the formula (4) and the larger is a correction amount of the consequent variable Wij(k−1) in the previous step. Further, because the second term is changed until the revolution number error ΔNe becomes null, correction (learning) of the consequent variable Wij(k−1) is carried out.

How the estimated torque Tp and the estimated torque change DTp vary depends on variations in characteristic such as resulted from the stroke shifts of control levers, the individual differences of engines and hydraulic pumps, models, etc. However, by setting membership functions so as to cover the entire range of variations in Tp and DTp, the pump control adaptable for the variations in characteristic can be realized. In other words, the antecedent rule most adaptable for the variations in characteristic is subject to arithmetic operation and the consequent variable Wij corresponding to the relevant antecedent rule is updated (learned) so that the revolution number error ΔNe is made zero.

The control output torque arithmetic section 56 computes, based on the consequent variable Wij(k) and the antecedent fit-factor combined value $\mu$ij, the control output torque Tr of the hydraulic pumps by using the following formula:

$$Tr=\Sigma(\mu ij\times Wij(k))/\Sigma\mu ij \quad (5)$$

The formula (5) is a formula for computing the so-called weighted average and represents a general method for determining an output value in fuzzy control.

If a set value of the accelerator dial is changed, the target revolution number Nset is also changed. In this first embodiment, therefore, the consequent variable Wij is prepared for each set value of the accelerator dial. This enables adequate control (learning) to be executed for each set value of the accelerator dial.

In the control system configured as explained above, the controller 21 estimates the torque of the hydraulic pumps 9, 10 during operation and computes the control output torque (a set value of the absorbing torque of the hydraulic pumps 9, 10) Tr based on the estimated torque Tp. The estimated torque Tp is computed based on the detected values of the first and second line pressures Pr1, Pr2 variable depending on the stroke shifts of the control levers 19, 20 in addition to the detected values of the engine revolution number Ne and the pump pressure Pp. As a result, the torque of the hydraulic pumps 9, 10 during operation can be accurately estimated; hence the absorbing torque of the hydraulic pumps 9, 10 can be controlled in a well-balanced manner with respect to the engine output even just before start and after end of manipulation of the control levers 19, 20 or even when the control levers 19, 20 are manipulated slightly.

Furthermore, the control output torque Tr of the hydraulic pumps 9, 10 is computed in a learning manner based on the product of the combined value of fit factors of the antecedent rules, which is obtained for each range of the estimated torque Tp and the estimated torque change DTp, and the error ΔNe of the actual revolution number Ne with respect to the target revolution number Nset of the engine. In spite of the output status of the hydraulic pumps 9, 10 varying depending on the model, the individual difference, etc. of the hydraulic shovel 1, or the dynamic characteristic of the engine revolution number varying depending on changes in working environment (e.g., a cold district or a warm district) and changes in engine characteristic caused by using different types of engine fuel, the control system computes the control output torque Tr of the hydraulic pumps 9, 10 based on the output status of the hydraulic pumps 9, 10 and the engine revolution number error ΔNe while repeating the learning process. As a result, the hydraulic pumps 9, 10 can be controlled in a manner adapted for the hydraulic shovel 1 under operation, i.e., individual hydraulic shovels.

In addition, since the controller 21 includes the learning process as explained above, there is obtained an advantage that the need of tuning the control system or modifying the control program for each model of hydraulic shovel is no longer required.

Figure 9:
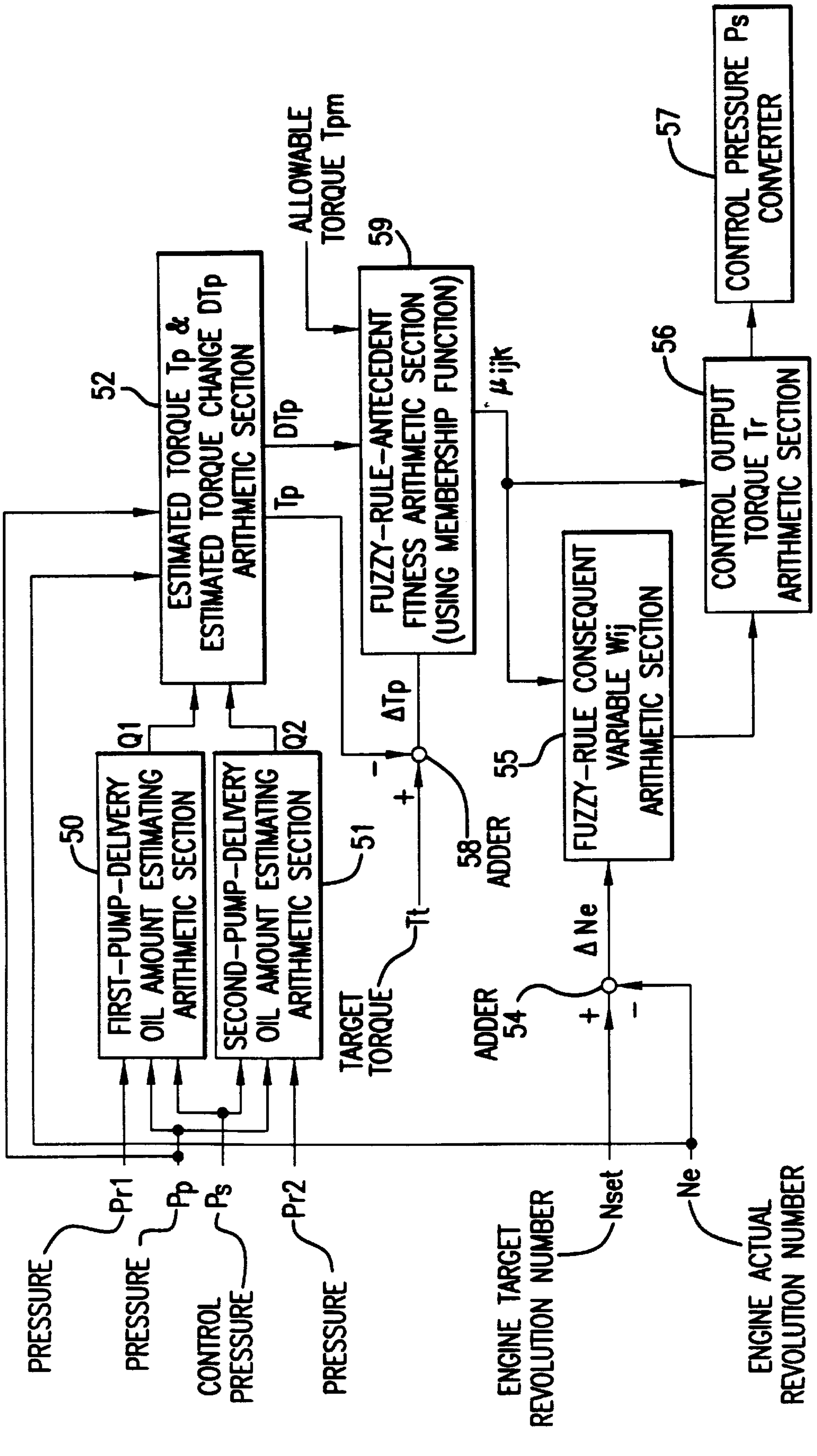
FIG. 9 is a block diagram showing the control sequence of a controller according to a second embodiment.
Figure 10:
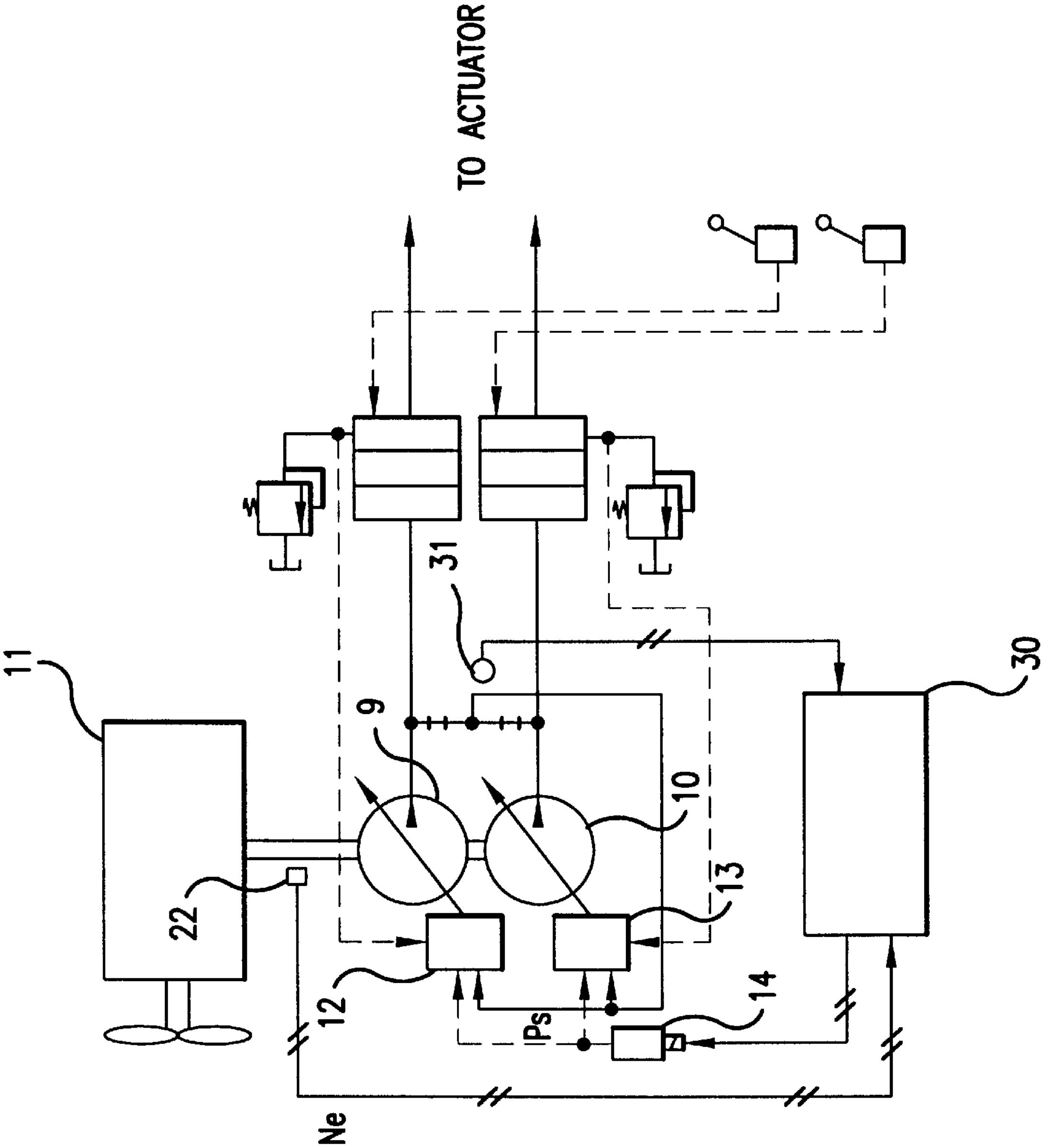
FIG. 10 is a schematic diagram showing the configuration of a conventional power unit system.

The control sequence of a controller according to a second embodiment will be described below with reference to a block diagram shown in FIG. 9. This second embodiment differs from the above first embodiment in input values applied to an antecedent arithmetic section.

More specifically, an antecedent arithmetic section 59 in the second embodiment receives a torque error ΔTp of the estimated torque Tp with respect to a target torque Tt of the hydraulic pumps 9, 10, the estimated torque change DTp, and an allowable torque Tpm of the hydraulic pumps 9, 10. The torque error ΔTp is calculated by an adder 58 to which are input the estimated torque Tp computed by the estimated torque arithmetic section 52 and the target torque Tt. The allowable torque Tpm means an upper limit value of torque beyond which the hydraulic pumps 9, 10 cannot absorb.

Because of receiving three input values; i.e., the torque error ΔTp, the estimated torque change DTp and the allowable torque Tpm, the antecedent arithmetic section 59 computes three values of fit factors of the antecedent rules and combines those three values. A combined value $\mu$ijk can be computed in a similar manner as with the above first embodiment. The resultant combined value $\mu$ijk is output to the consequent arithmetic section 55 and the control output torque arithmetic section 56 where the combined value $\mu$ijk is applied to the above formulae (4) and (5) for determining the control output torque Tr of the hydraulic pumps 9, 10.

In the above process, the target torque Tt and the engine target revolution number Nset are prepared for each set value of the accelerator dial corresponding to the engine output characteristics as shown in FIG. 4, and then stored in a memory (not shown). By so modifying the system, the need of individually setting the consequent variable Wij for each set value of the accelerator dial is eliminated and the required memory capacity can be cut down in this second embodiment.

Further, in this second embodiment, since the control arithmetic operation is executed based on not only the revolution number error ΔNe with respect to the target revolution number Nset of the engine, but also the torque error ΔTp with respect to the target torque Tt, the hydraulic pumps can be controlled in a manner adapted for changes of both the errors caused depending on the operating conditions, the individual differences of hydraulic shovels, and working environment.

Note that components which are common to (the same as) those in the first embodiment are denoted by the same reference numerals in the second embodiment, and are not explained here.

It should be understood that the present invention is of course not limited to the above first and second embodiments. As a modification, for example, the delivery oil amounts of the hydraulic pumps may be calculated from the stroke shifts of the control levers. In this case, stroke shift detecting means for detecting the stroke shift of each control lever is provided, and a detection signal of the stroke shift detecting means is input to each of the delivery oil amount arithmetic sections of the controller.

What is claimed is:

1. A hydraulic pump control system for use with a variable displacement hydraulic pump driven by an engine and supplying pressurized oil to a hydraulic actuator in accordance with a stroke shift of an operating unit, said control system comprising:

means for detecting an actual revolution number of said engine;

means for detecting an output status of said hydraulic pump; and said means for detecting an actual revolution number and said means for detecting an output status being connected to a controller for controlling an output torque of said hydraulic pump by estimating a torque of said hydraulic pump during operation from a detection result of said means for detecting an output status and controlling an output torque of said hydraulic pump based on the estimated torque so that an engine revolution number error equal to a difference between a preset target revolution number and the actual revolution number of said engine approaches zero, wherein said controller includes an estimated torque arithmetic section for estimating a delivery oil amount of said hydraulic pump during operation from the detection result of said means for detecting an output status, and computing an estimated torque of said hydraulic pump and an estimated torque change per unit time based on the estimated delivery oil amount.

2. The hydraulic pump control system according to claim 1, wherein said controller includes a fit factor arithmetic section for determining, based on the estimated torque and the estimated torque change per unit time both computed by said estimated torque arithmetic section, a first fit factor of the estimated torque for a first preset numeral range and a second fit factor of the estimated torque change per unit time for a second preset numeral range, and then computing a combined value of the first and second fit factors, and controls the output torque of said hydraulic pump based on the combined value of the first and second fit-factors computed by said fit factor arithmetic section and the engine revolution number error.

3. The hydraulic pump control system according to claim 2, wherein said controller includes a fuzzy-rule-antecedent arithmetic section for applying the estimated torque and the estimated torque change per unit time both computed by said estimated torque arithmetic section to each of sets of antecedent rules for fuzzy control, computing fit factors for said sets of antecedent rules by using membership functions of said antecedent rules, and computing a combined value of the fit factors for each of said sets of said antecedent rules, and a fuzzy-rule-consequent arithmetic section for computing a consequent variable based on each combined value of the fit factors computed by said fuzzzy-rule-antecedent arithmetic section and the engine revolution number error, and wherein said controller calculates an average value of the consequent variables from the combined values of the fit factors and the consequent variables each computed by said antecedent and consequent arithmetic sections, respectively, and controls the output torque of said hydraulic pump based on the calculated average value.

4. The hydraulic pump control system according to claim 1, wherein said means for detecting an output status comprises means for detecting a delivery pressure of said hydraulic pump, and means for detecting the stroke shift of said operating unit or means for detecting a line pressure variable depending on the stroke shift of said operating unit.

5. The hydraulic pump control system according to claim 4, wherein said controller includes a fit factor arithmetic section for determining, based on the estimated torque and the estimated torque change both computed by said estimated torque arithmetic section, a first fit factor of the estimated torque for a first preset numeral range and a second fit factor of the estimated torque change per unit time for a second preset numeral range, and then computing a combined value of the first and second fit factors, and controls the output torque of said hydraulic pump based on the combined value of the first and second fit factors computed by said fit factor arithmetic section and the engine revolution number error.

6. The hydraulic pump control system according to claim 5, wherein said controller includes a fuzzy-rule-antecedent arithmetic section for applying the estimated torque and the estimated torque change per unit time both computed by said estimated torque arithmetic section to each of sets of antecedent rules for fuzzy control, computing fit factors for said sets of antecedent rules by using membership functions of said antecedent rules, and computing a combined value of the fit factors for each of said sets of said antecedent rules, and a fuzzy-rule-consequent arithmetic section for computing a consequent variable based on each combined value of the fit factors computed by said fuzzy-rule-antecedent arithmetic section and the engine revolution number error, and wherein said controller calculates an average value of the consequent variables from the combined values of the fit factors and the consequent variables each computed by said antecedent and consequent arithmetic sections, respectively, and controls the output torque of said hydraulic pump based on the calculated average value.

7. The hydraulic pump control system according to claim 1, wherein said controller includes a fit factor arithmetic section for, based on the estimated torque and the estimated torque change per unit time both computed by said estimated torque arithmetic section, computing an error of the estimated torque with respect to a target torque and determining a first fit factor of the estimated torque error for a first preset numeral range, a second fit factor of the estimated torque change per unit time for a second preset numeral range, and a third fit factor of a pump allowable torque for a third preset numeral range, and for then computing a combined value of the first, second and third fit factors, and controls the output torque of said hydraulic pump based on the combined value of the fit factors computed by said fit factor arithmetic section and the engine revolution number error.

8. The hydraulic pump control system according to claim 7, wherein said controller includes a fuzzy-rule-antecedent arithmetic section for applying the error of the estimated torque, estimated by said estimated torque arithmetic section, with respect to the target torque, the estimated torque change per unit time, and the pump allowable torque to each of sets of antecedent rules for fuzzy control, computing fit factors of said sets of antecedent rules by using membership functions of said antecedent rules, and computing a combined value of the fit factors of each set of said antecedent rules, and a fuzzy-rule-consequent arithmetic section for computing a consequent variable based on each combined value of the fit factors computed by said fuzzy-rule-antecedent arithmetic section and the engine revolution number error, and wherein said controller calculates an average value of the consequent variables from the combined values of the fit factors and the consequent variables each computed by said antecedent and consequent arithmetic sections, respectively, and controls the output torque of said hydraulic pump based on the calculated average value.

9. The hydraulic pump control system according to claim 4, wherein said controller includes a fit factor arithmetic section for, based on the estimated torque and the estimated torque change per unit time both computed by said estimated torque arithmetic section, computing an error of the estimated torque with respect to a target torque and determining a first fit factor of the estimated torque error for a first preset numeral range, a second fit factor of the estimated torque change per unit time for a second preset numeral range, and a third fit factor of a pump allowable torque for a third preset numeral range, and for then computing a combined value of the first, second and third fit factors, and controls the output torque of said hydraulic pump based on the combined value of the fit factors computed by said fit factor arithmetic section and the engine revolution number error.

10. The hydraulic pump control system according to claim 9, wherein said controller includes a fuzzy-rule-antecedent arithmetic section for applying the error of the estimated torque, estimated by said estimated torque arithmetic section, with respect to the target torque, the estimated torque change per unit time, and the pump allowable torque to each of sets of antecedent rules for fuzzy control, computing fit factors of said sets of antecedent rules by using membership functions of said antecedent rules, and computing a combined value of the fit factors of each set of said antecedent rules, and a fuzzy-rule-consequent arithmetic section for computing a consequent variable based on each combined value of the fit factors computed by said fuzzy-rule-antecedent arithmetic section and the engine revolution number error, and wherein said controller calculates an average value of the consequent variables from the combined values of the fit factors and the consequent variables each computed by said antecedent and consequent arithmetic sections, respectively, and controls the output torque of said hydraulic pump based on the computed average value.

* * * * *